United States Patent [19]
Steins et al.

[11] Patent Number: 5,410,566
[45] Date of Patent: Apr. 25, 1995

[54] METHOD OF PRODUCING METAL MELTS AND AN ELECTRIC ARC FURNACE THEREFOR

[75] Inventors: Johannes Steins, Gallneukirchen; Harald Berger; Peter Mittag, both of Linz, all of Austria

[73] Assignee: Voest-Alpine Industrieanlagenbau GmbH, Linz

[21] Appl. No.: 984,972

[22] Filed: Dec. 3, 1992

[30] Foreign Application Priority Data

Dec. 16, 1991 [AT] Austria .................. 2491/91

[51] Int. Cl.⁶ .................................. F27D 3/00
[52] U.S. Cl. .......................... 373/82; 373/81; 422/232
[58] Field of Search ............ 373/82, 19, 79, 81, 373/88; 75/10.43, 10.44, 10.46; 422/232, 442

[56] References Cited

U.S. PATENT DOCUMENTS

| | | | |
|---|---|---|---|
| 2,971,040 | 2/1961 | Sem | 373/82 |
| 3,585,269 | 6/1971 | Krause | 373/82 |
| 3,759,696 | 9/1973 | Einer et al. | 373/88 |
| 4,037,043 | 7/1977 | Segsworth | 373/19 |
| 4,039,738 | 8/1977 | Beskin et al. | 373/82 |
| 4,146,390 | 3/1979 | Widell | 75/11 |
| 4,147,887 | 4/1979 | Yasukawa et al. | 373/81 |
| 4,370,223 | 1/1983 | Bose | 208/125 |
| 4,491,568 | 1/1985 | Bortnik et al. | 423/442 |
| 4,816,230 | 3/1989 | Bortnik et al. | 373/82 |

FOREIGN PATENT DOCUMENTS

| | | |
|---|---|---|
| 0216395 | 1/1987 | European Pat. Off. . |
| 1508256 | 4/1970 | Germany . |
| 1758759 | 8/1970 | Germany . |
| 2900864 | 7/1979 | Germany . |
| 3022566 | 1/1981 | Germany . |
| 2944269 | 4/1982 | Germany . |
| 3241987 | 6/1984 | Germany . |
| 3700769 | 7/1988 | Germany . |
| 823428 | 11/1959 | United Kingdom . |

Primary Examiner—Bruce A. Reynolds
Assistant Examiner—Tu Hoang
Attorney, Agent, or Firm—Hopgood, Calimafde, Kalil & Judlowe

[57] ABSTRACT

In a method of producing metal melts, in particular a steel melt from scrap, in an electric arc furnace having at least one graphite electrode, organic substances are charged into the electric arc through a central longitudinal recess of the graphite electrode so as to reduce electrode consumption.

5 Claims, 3 Drawing Sheets

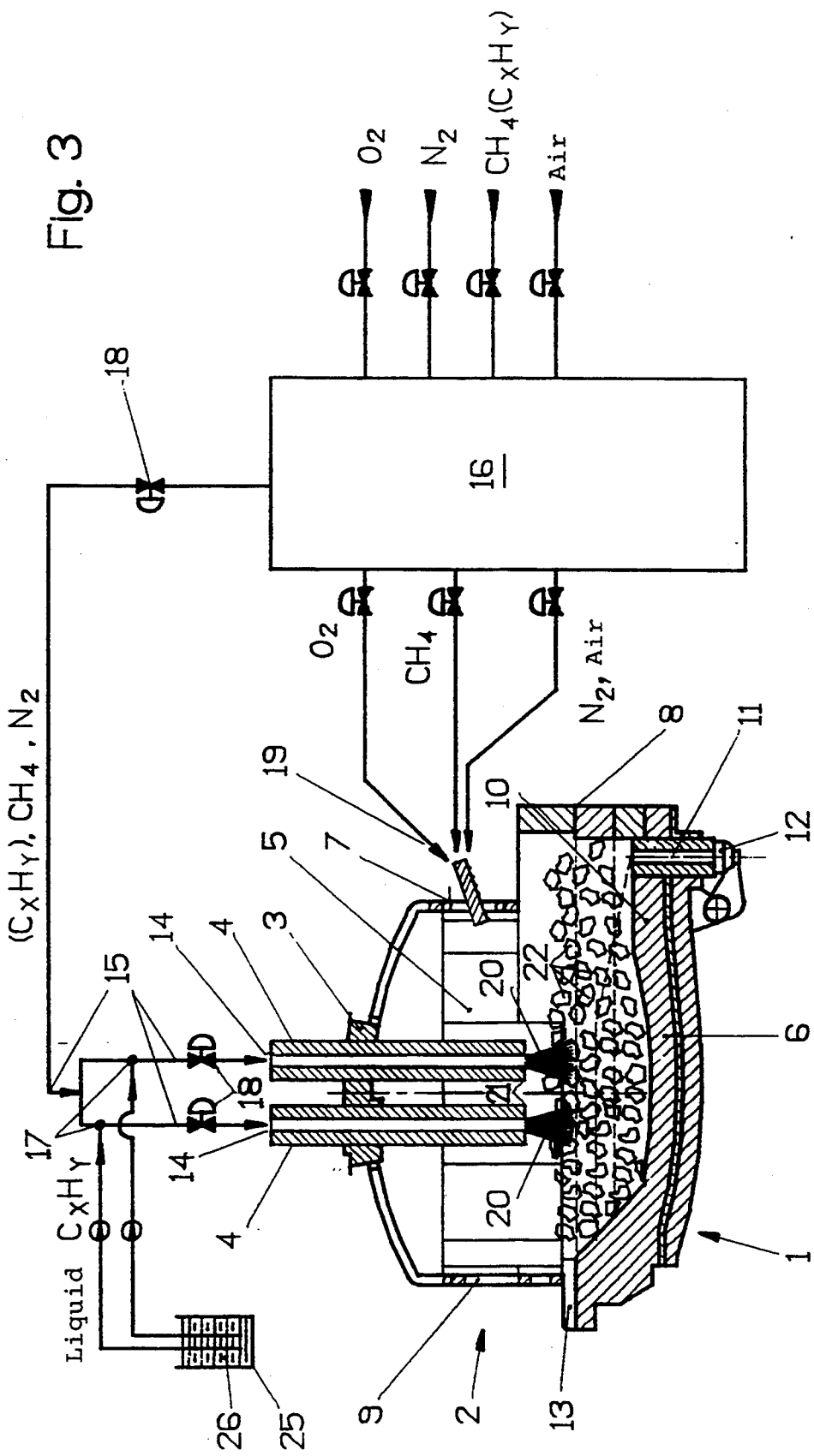

METHOD OF PRODUCING METAL MELTS AND AN ELECTRIC ARC FURNACE THEREFOR

The invention relates to a method of producing metal melts, in particular a steel melt from scrap, in an electric arc furnace comprising at least one graphite electrode, as well as to an electric arc furnace for carrying out the method.

BACKGROUND OF THE INVENTION INCLUDING THE PRIOR ART

Electric furnaces comprising graphite electrodes which introduce the electric energy by the formation of an electric arc (such as is known e.g. from DE-A-32 41 987 and DE-C-29 44 269) exhibit a relatively high electrode consumption at the tip, primarily if operated as an anode, which electrode consumption depends on the square of the current and is caused thermally by the electron exchange. So far, this electrode tip consumption had to be taken as a fact and has constituted a cost factor hitherto viewed as unavoidable.

The invention aims at avoiding these disadvantages and difficulties and has as its object to provide a method as well as an electric arc furnace for carrying out the method, by which the electrode consumption is substantially reduced. In particular, it shall also be possible to greatly reduce the consumption of a graphite electrode connected as an anode, such that the consumption of the anodically connected graphite electrode is not substantially higher than the consumption of a cathodically connected graphite electrode. However, this shall not be disadvantageous to the melting procedure, i.e. the efficiency and the melting capacity shall be at least equal to those of conventional electric arc furnaces.

According to the invention, this object is achieved in that organic substances are introduced into the electric arc via a central longitudinal recess of the graphite electrode.

The introduction of the organic substances into the hottest region of the electric arc furnace causes a decomposition of these substances, i.e. an energy-consuming splitting reaction. This leads to a cooling effect lowering the temperature at the electrode tip so much that the graphite consumption is considerably reduced.

Hollow electrodes have, e.g., been known from DE-A-29 00 864 and DE-A-30 22 566. According to DE-A-29 00 864 these known hollow electrodes serve for introducing lime, carbon, aluminum oxide or other alloying additives by means of a carrier gas, such as a noble gas, nitrogen, oxygen or air, or, according to DE-A-30 22 566, for introducing additives, such as silt, coke or lime.

SUMMARY OF THE INVENTION

According to the invention, as the organic substances preferably hydrocarbons in the solid, liquid and/or gaseous forms are introduced into the electric arc, are decomposed there under cooling of the electrode tip, and the decomposition products are burnt furtheron.

The cooling effect of the crack process entails a particularly efficient cooling of the hot electrode tip. According to the invention, this offers the chance of combining the cooling of the electrode tip with an environmentally safe disposal of solid or liquid hydrocarbons, such as, e.g., of synthetic materials or used oils, with simultaneous energetic utilization.

Due to the high temperature of the electric arc at which the crack process occurs immediately, the formation of environmentally dangerous organic compounds, such as dioxins and furanes, is avoided and the emissions fall below the respective emission values fixed by the authorities.

An electric arc furnace for carrying out the method according to the invention is characterised by at least one graphite electrode having a central longitudinal recess, whose end protruding from the electric arc furnace is connected to a duct conveying organic substances, the duct suitably including a mixing station for admixing solid and/or liquid hydrocarbons.

BRIEF DESCRIPTION OF THE DRAWING

The invention will now be explained in more detail by way of a few exemplary embodiments illustrated in the drawings, wherein FIGS. 1 to 3 each schematically illustrate an electric arc furnace in cross-section.

DESCRIPTION OF THE PREFERRED EMBODIMENT

Figure 1:
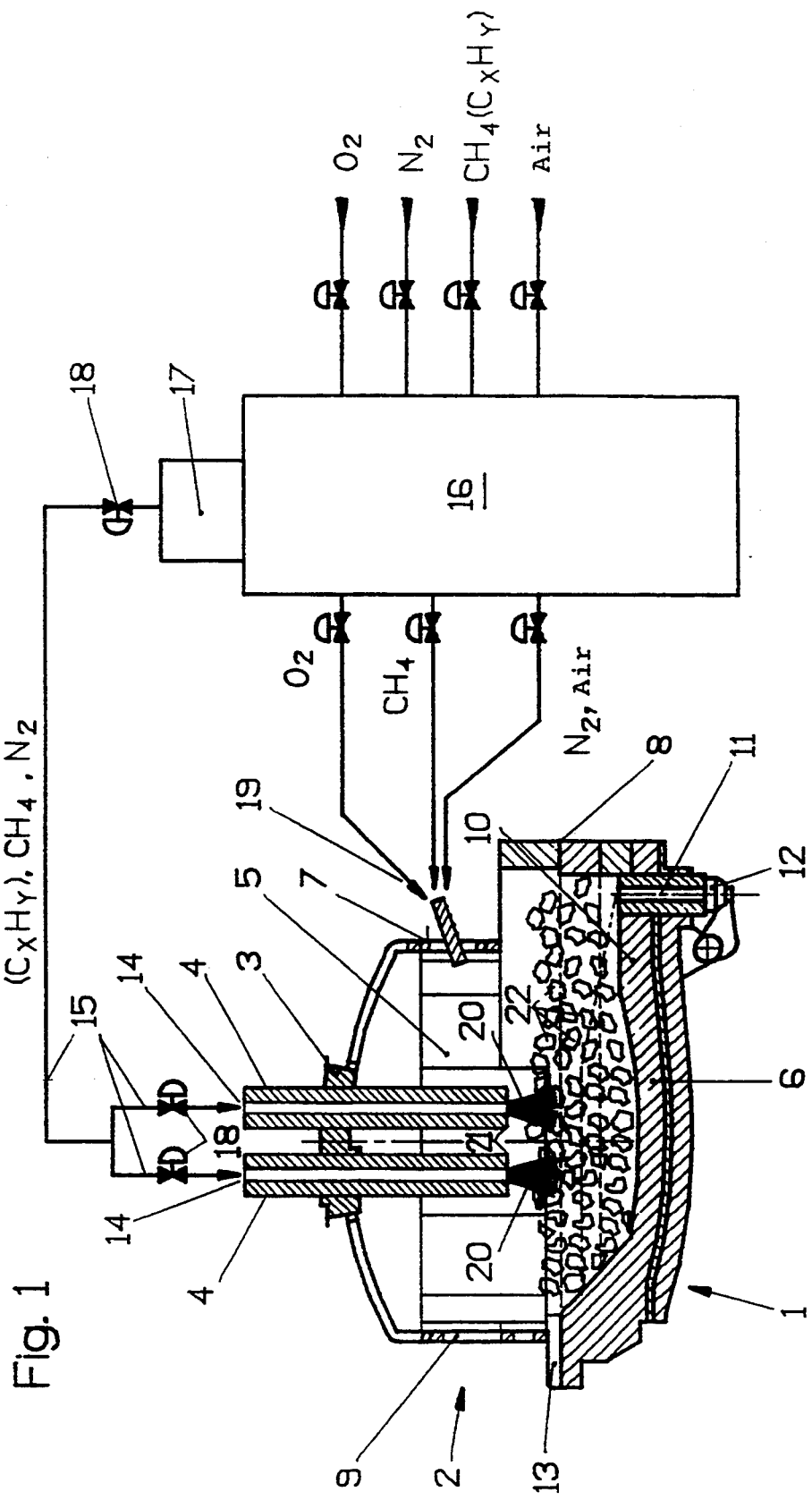

The tiltable electric furnace which has approximately the same design in all the Figures and which in principle is suitable to be operated by direct current or by alternating current has a tub-shaped lower part 1 approximately circular in plan view, and an upper part 2 superimposed on the lower part 1, through whose schematically indicated lid 3 graphite electrodes 4, preferably three graphite electrodes 4 arranged in a partial circle, are guided into the furnace interior 5. The tub-shaped lower part 1 is provided with a refractory brickwork 6 and has an upper part 2 formed by wall elements 9 passed by a coolant flow. On one side 7, an oriel-shaped projection 8 is provided on the lower part 1. In the bottom 10 of the projection 8, a tap hole 11 is provided, which may be closed and opened by a closure means 12 not illustrated in detail. For the purpose of tapping slag, a slag pouring spout 13 is provided on the lower part radially opposite the projection 8, which slag pouring spout is closable by means of a door not illustrated.

The graphite electrodes 4 are designed as hollow electrodes having a central recess or through opening 14. All the graphite electrodes 4 are connected to conveying ducts 15, which end united in a valve station 16. To this valve station air, $CH_4$ or $C_xH_y$, $N_2$ and $O_2$ may be supplied. $CH_4$, $CXH_4$ or $N_2$ are selectively supplied to the supplying ducts 15 leading to the electrodes 4 via a mixing station 17 and regulating valves 18, the amount ratios of the gases supplied being adjusted in dependence on the operating state of the electric arc furnace.

Furthermore, one or several gas-oxygen-burner lances 19 are inserted into the upper part 2 of the electric furnace, which lances are supplied by the valve station with $O_2$, $CH_4$, $N_2$ and air, the composition of these gases being adjustable according to the operational conditions desired.

According to the embodiment of FIG. 1, primarily gaseous hydrocarbons are supplied through the hollow electrodes 4 to the electric arc 20. The conditions adjusting at the electrode are described below:

The hydrocarbons guided through the recess 14 of a hollow electrode 4 to the very hot electrode tip 21 are decomposed at the electrode tip in an endothermic splitting reaction into their components with a corresponding cooling effect. If, for instance, methane ($CH_4$) is cracked into its components carbon and hydrogen, 2.5 $Mcal/Nm^3$ of $CH_4$ are consumed. This cooling effect lowers the temperature at the electrode tip 21 so much that the graphite consumption is considerably lowered.

The cooling effect is composed of the consumed splitting energy of the hydrocarbons and of the consumed energy necessary to heat the splitting products carbon and hydrogen in the electric arc from approximately room temperature to above 1500° C.

The saving in electrode graphite by the splitting-cooling results in an increased consumption of energy, which, however, is compensated by the energy yield from the combustion of the splitting products carbon: $C+O_2 \rightarrow CO_2 - Q_c$ ($Q_c = 7.9$ Mcal/kg C) and
hydrogen: $2H_2 + O_2 \rightarrow 2H_2O - Q_H$ ($Q_H = 2.7$ Mcal/Nm³ $H_2$).

The energy-consuming cooling reactions occur at the electrode tip 21, the energy-supplying reactions occur in the respective reaction space and are utilized to aid the melt-down process of the charging material, e.g. scrap 22.

Figure 2:
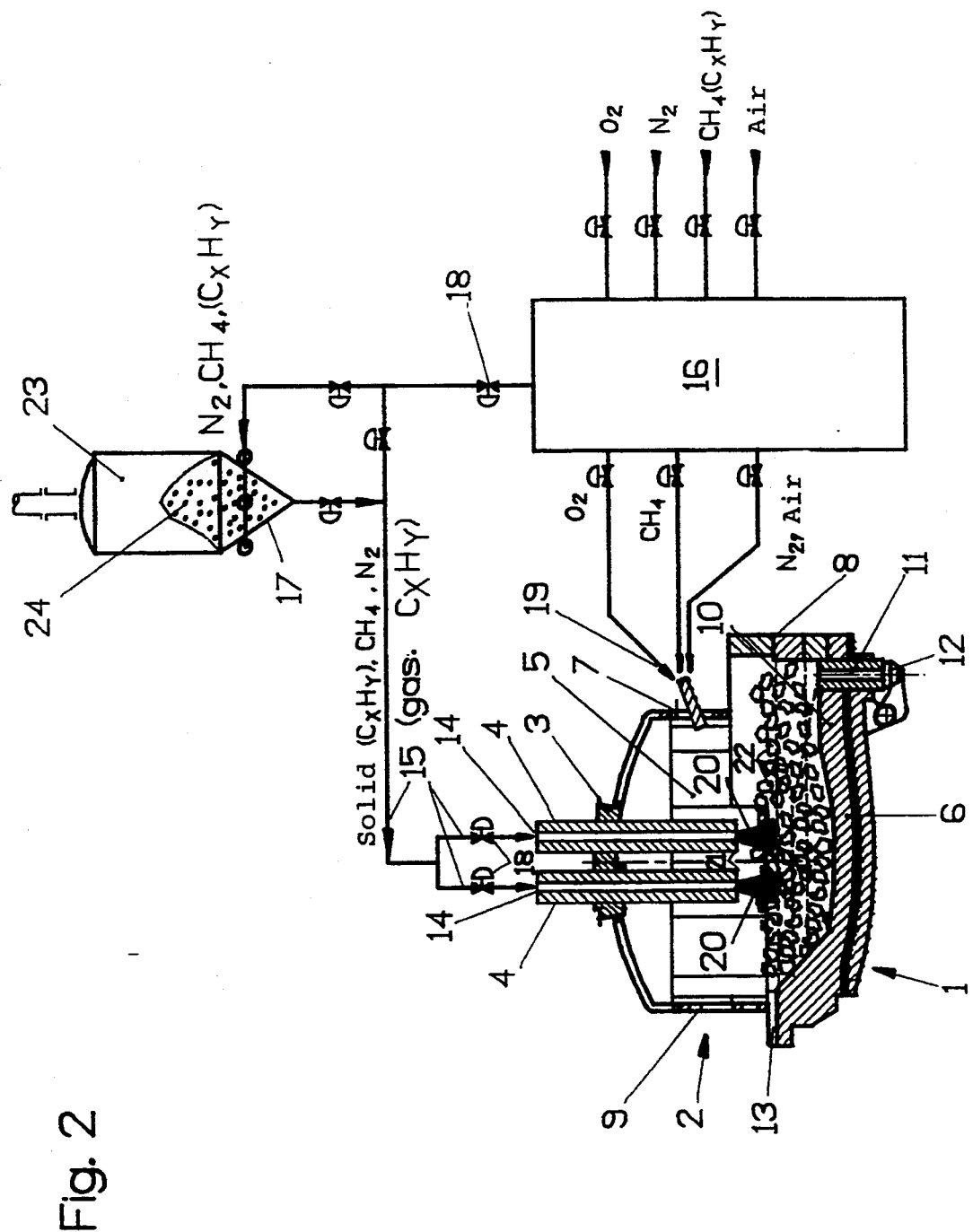

In FIGS. 2 and 3 the blowing in of solid hydrocarbons 24 (in the form of synthetic material wastes) provided in a storage container 23 through the hollow electrodes 4 into the electric arc 20 or the blowing in of liquid hydrocarbons 26 (e.g. used oils) collected in a storage container 25 is illustrated. In both cases a gas, e.g. $CH_4$, $C_xH_y$, $N_2$, introduced under pressure through the hollow electrodes, serves as the conveying means.

The above described cooling effect at the electrode tip also occurs at the disposal of solid hydrocarbons (e.g. synthetic materials) and liquid hydrocarbons (e.g. used oils), and the splitting products advantageously are used for the recovery of energy and transmission of the same onto the melting stock.

The advantages of the method according to the invention as compared to conventional melting processes can be summarized as follows:

Low electrode consumption due to the cooling effect at the electrode tip

In the direct current furnace it is possible to do without the bottom anode because a graphite electrode can be connected as anode without the disadvantage of a 3-times higher tip consumption of the anodically connected electrode as compared to the cathodically connected electrode.

Energy recovery at the melting of scrap by combustion of the splitting products C to $CO_2$ and $H_2$ to $H_2O$.

Chance of an environmentally acceptable (i.e. non-polluting) disposal of organic substances in the electric arc with simultaneous enegertic utilization.

What we claim is:

1. In a method of producing metal melts in an electric arc furnace comprising at least one graphite electrode having a tip end at which an electric arc is formed, while substantially reducing electrode consumption in the region of the tip end, the improvement wherein said at least one graphite electrode has a central longitudinal opening therethrough and wherein thermally decomposable organic substances are charged into the electric arc formed in said electric arc furnace through said central longitudinal opening of said at least one graphite electrode such that thermal decomposition of said organic substances results in a cooling effect of said electrode, thereby substantially reducing electrode consumption.

2. A method as set forth in claim 1, wherein said organic substances charged into said electric arc are hydrocarbons in at least one of the solid, liquid and gaseous forms, further comprising decomposing said organic substances in said electric arc and thereby form decomposition products thereof which enable the cooling of the electrode tip, and subsequently burning said decomposition products.

3. A method as set forth in claim 2, wherein said hydrocarbons in the solid form are synthetic material wastes.

4. A method as set forth in claim 3, further comprising providing a carrier gas and conveying said synthetic material wastes pneumatically into said electric arc together with said carrier gas.

5. A method as set forth in claim 2, wherein said hydrocarbons in the liquid form are used oils.

* * * * *